US 8,081,167 B2

(12) United States Patent
Kim et al.

(10) Patent No.: US 8,081,167 B2
(45) Date of Patent: Dec. 20, 2011

(54) TOUCH SENSITIVE DISPLAY DEVICE, AND DRIVING METHOD THEREOF

(75) Inventors: Joo-Young Kim, Suwon-si (KR);
Cheol-Woo Park, Suwon-si (KR);
Uk-Chul Choi, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 828 days.

(21) Appl. No.: 12/080,329

(22) Filed: Apr. 1, 2008

(65) Prior Publication Data
US 2008/0314652 A1    Dec. 25, 2008

(30) Foreign Application Priority Data

Jun. 21, 2007 (KR) .................. 10-2007-0061090

(51) Int. Cl.
*G06F 3/041* (2006.01)
(52) U.S. Cl. ........ 345/173; 345/174; 345/175; 345/104; 178/18.01; 178/18.02; 178/18.03
(58) Field of Classification Search ............... 345/104
See application file for complete search history.

(56) References Cited

U.S. PATENT DOCUMENTS

| | | | |
|---|---|---|---|
| 5,926,163 A * | 7/1999 | Nishimura | 345/104 |
| 6,075,520 A * | 6/2000 | Inoue et al. | 345/173 |
| 6,965,377 B2 * | 11/2005 | Yanagisawa et al. | 345/173 |
| 7,602,380 B2 * | 10/2009 | Yoshida et al. | 345/173 |
| 2005/0219272 A1 | 10/2005 | Johnson et al. | |
| 2005/0243068 A1 | 11/2005 | Johnson et al. | |
| 2006/0017709 A1 | 1/2006 | Okano | |
| 2006/0097991 A1 * | 5/2006 | Hotelling et al. | 345/173 |
| 2006/0214918 A1 | 9/2006 | Destura et al. | |
| 2007/0063990 A1 * | 3/2007 | Park et al. | 345/173 |

(Continued)

FOREIGN PATENT DOCUMENTS

JP    2001-312370 A  * 11/2001

(Continued)

OTHER PUBLICATIONS

Patent Abstracts of Japan, Publication No. 2004-029399, Jan. 29, 2004, 1 p.
Patent Abstracts of Japan, Publication No. 2006-039686, Feb. 9, 2006, 1 p.

(Continued)

*Primary Examiner* — Richard Hjerpe
*Assistant Examiner* — Christopher Thompson
(74) *Attorney, Agent, or Firm* — Innovation Counsel LLP (57) ABSTRACT

A display device having a contact sensing function, and a driving method thereof are disclosed in one embodiment. The driving method of a display device includes reading sense data signals of a current sensing unit row, determining whether the sense data signals are included in a contactable range and converting the sense data signals into preliminary signals that each have a predetermined value based on the determination result, determining whether a sensed area (an X axis sensed area) in an X axis direction exists using the preliminary signals, determining whether the X axis sensed area is effective when the X axis sensed area exists, determining whether a sensed area (a Y axis sensed area) in a Y axis direction exists when the X axis sensed area is effective, determining whether the Y axis sensed area is effective when the Y axis sensed area exists, determining a contact position when the Y axis sensed area is effective, and reading sense data signals of a next sensing unit row when the X axis sensed area or the Y axis sensed area is not effective.

19 Claims, 7 Drawing Sheets

U.S. PATENT DOCUMENTS

| | | | |
|---|---|---|---|
| 2007/0091078 A1* | 4/2007 | Park et al. | 345/173 |
| 2007/0200833 A1* | 8/2007 | Park et al. | 345/173 |
| 2008/0218489 A1* | 9/2008 | Park et al. | 345/173 |
| 2008/0231606 A1* | 9/2008 | Moon | 345/173 |

FOREIGN PATENT DOCUMENTS

| | | |
|---|---|---|
| JP | 2004-29399 | 1/2004 |
| JP | 2006-39686 | 2/2006 |
| JP | 2006-146895 | 6/2006 |
| JP | 2007-18086 | 1/2007 |
| KR | 2003-0070624 | 9/2003 |
| KR | 2006-0041576 | 5/2006 |
| KR | 2006-0133330 | 12/2006 |

OTHER PUBLICATIONS

Patent Abstracts of Japan, Publication No. 2006-146895, Jun. 8, 2006, 1 p.

Patent Abstracts of Japan, Publication No. 2007-018086, Jan. 25, 2007, 1 p.

Korean Patent Abstracts, Publication No. 1020030070624, Sep. 2, 2003, 1 p.

Korean Patent Abstracts, Publication No. 1020060041576, May 12, 2006, 1 p.

Korean Patent Abstracts, Publication No. 1020060133330, Dec. 26, 2006, 1 p.

* cited by examiner

TOUCH SENSITIVE DISPLAY DEVICE, AND DRIVING METHOD THEREOF

CROSS-REFERENCE TO RELATED APPLICATION

This application claims priority to Korean Patent Application No. 10-2007-0061090 filed on Jun. 21, 2007, and all the benefits accruing therefrom under 35 U.S.C. 119, the contents of which in its entirety are herein incorporated by reference.

BACKGROUND OF THE INVENTION (a) Field of the Invention

The present invention relates to a display device having a contact sensing function, and a driving method thereof.

(b) Description of the Related Art

There has been much research actively directed to developing a flat panel display device that uses an electrophoretic display device (EPD) or a liquid crystal display (LCD).

The electrophoretic display device includes a display panel assembly having pixels, each of which includes a switching element connected to an electrophoretic capacitor and display signal lines, an image scanning driver for turning on/off the switching elements of the pixels by applying a scanning signal formed of a gate-on voltage and a gate-off voltage to gate lines among the display signal lines, and an image data driver for applying data voltages to pixels through turned-on switching elements by applying the data voltages to data lines among the display signal lines.

In addition, recently, display devices having a contact sensitive function (hereinafter, referred to as "touch sensitive displays") have been developed. The touch sensitive display includes a sense scanning driver and a sense signal processor as well as the display panel assembly, the image scanning driver, and the data driver.

The touch sensitive display is an apparatus that writes or draws a character or a picture through contact with a finger, a pen, etc., on a screen. Touch screen panels may also allow a machine such as a computer to perform a desired command by executing a program when an icon is pressed. The touch sensitive display determines whether a contact occurs, and determines contact position information when the contact occurs by sensing a variation of light applied to the display panel assembly.

However, accuracy of the position determination by the light variation decreases due to shadows, etc. In addition, for determining a contact position, the touch sensitive display needs images of one or more frames, which increases capacity needs of a memory.

SUMMARY OF THE INVENTION

According to an embodiment of the present invention, a driving method of a display device is provided, which includes: reading sense data signals of a current sensing unit row, which are sequentially input; determining whether the sense data signals are included in a contactable range and converting the sense data signals into preliminary signals, each of which has a predetermined value based on the determination result; determining whether a sensed area (referred to as a "X axis sensed area") in an X axis direction exists using the preliminary signals; determining whether the X axis sensed area is effective when the X axis sensed area exists; determining whether a sensed area (referred to as a "Y axis sensed area") in an Y axis direction exists when the X axis sensed area is effective; determining whether the Y axis sensed area is effective when the Y axis sensed area exists; determining a contact position when the Y axis sensed area is effective; and reading sense data signals of a next sensing unit row when the X axis sensed area or the Y axis sensed area is not effective. The preliminary signal conversion may include converting the sensing data signals of a row of sensing units, of which values are included in a first range, into the preliminary signals having a first value, and converting the sensing signals of a row of sensing units, of which values are included in a second range, into the preliminary signals having a second value. Herein, the first range and the second range differ.

The existence determination of the X axis sensed area may determine that the X axis sensed area starts when the value of the preliminary signal is changed from the first value or the second value to the second value or the first value, respectively, and determine that the X axis sensed area finishes when the value of the preliminary signal is changed from the second value or the first value to the first value or the second value.

The preliminary signals may output from sensing units included in the X axis sensed area having the same values.

The effectiveness determination of the X axis sensed area may include: determining whether the X axis sensed area exists; calculating a row length and determining whether the row length is included in a first effective range, when the X axis sensed area exists; calculating a center position value when the row length is included in the first effective range; determining whether a center start position value exists; storing the calculated center position value (referred to as "current center position value") as the center start position value when the center start position value does not exist and storing a number of the current sensing unit row as a Y axis start position value; calculating a distance between the center start position value and the current center start position value when the center start position value exists; determining whether the distance is included in a second effective range; and/or storing the number of the current sensing unit row as a Y axis end position value when the distance is included in the second effective range and storing the current center position value as the center start position value.

The effectiveness determination of the X axis sensed area may further include determining whether the Y axis sensed area exists when the X axis sensed area does not exist, when the row length is not included in the first effective range, or determining whether the distance is not included in the second effective range.

The effectiveness determination of the X axis sensed area may further include outputting a signal indicating a state in which the row length is not included in the first effective range or a state in which the distance is not included in the second effective range.

The effectiveness determination of the Y axis sensed area may include determining whether the Y axis end value exists, calculating a column length based on the Y axis start position value and the Y axis end position value when the Y axis end position value exists, determining whether the calculated column length is included within a third effective range, going to the contact position determination when the calculated column length is included in the third effective range, and/or initializing variables when the calculated column length is not included in the third effective range.

The contact position determination may include defining the center start position value as an X axis coordinate of the contact position and calculating a Y axis coordinate of the contact position based on the Y axis start position value and the Y axis end position value, and initializing variables.

The contact position determination may include defining a center position value of the Y axis start position value and the Y axis end position value as the Y axis coordinate of the contact position.

The first effective range may be the same as the second effective range.

According to another embodiment of the present invention, a display device is provided, which includes a display panel having a plurality of sensing units and a plurality of sense data lines connected to the sensing units, a sense signal processor connected to the display panel and receiving analog sense data signals from the sense data lines and converting the analog sense data signals to digital sense data signals, and a contact position determiner connected to the sense signal processor and determining a contact position based on the digital sense data signals. The contact position determiner may include a processor reading the sense data signals of a current sensing unit row, which are sequentially input, and determining whether the sense data signals are included in a contactable range to convert the sense data signals into preliminary signals; and an operator determining whether an X axis sensed area exists, determining whether the X axis sensed area is effective when the X axis sensed area exists, determining whether a Y axis sensed area exists when the X axis sensed area is effective, determining whether the Y axis sensed area is effective when the Y axis sensed area exists, determining a contact position when the Y axis sensed area is effective, and reading sense data signals of a next sensing unit row when the X axis sensed area or the Y axis sensed area is not effective.

Each of the digital sense data signals may have a predetermined number of bits. The processor may convert the digital sense data signals having values that are included in a predetermined range to the preliminary signals having a first value, and convert the digital sense data signals having values that are not included in a predetermined range to the preliminary signals having a second value.

Each of the preliminary signals may have one bit.

The X axis sensed area may start when the value of the preliminary signal is changed from the second value to the first value, and finish when the value of the preliminary signal is changed from the first value to the second value.

The operator may calculate a row length and determine whether the row length is included in a first effective range, when the X axis sensed area exists; calculate a center position value when the row length is included within the first effective range; determine whether a center start position value exists; store the calculated center position value (referred to as "current center position value") as the center start position value when the center start position value does not exist and store a number of the current sensing unit row as a Y axis start position value; calculate a distance between the center start position value and the current center start position value when the center start position value exists; determine whether the distance is included within a second effective range; and store the number of the current sensing unit row as a Y axis end position value when the distance is included within the second effective range and store the current center position value as the center start position value.

The operator may determine whether the Y axis sensed area exists when the X axis sensed area does not exists, when the row length is not included in the first effective range, or whether the distance is not included in the second effective range.

The operator may determine whether the Y axis end value exists, calculate a column length based on the Y axis start position value and the Y axis end position value when the Y axis end position value exists, determine whether the calculated column length is included in a third effective range, and go to the contact position determination when the calculated column length is included in the third effective range.

The operator may initialize variables when the calculated column length is not included in the third effective range.

BRIEF DESCRIPTION OF THE DRAWINGS

The present invention will become more apparent by describing embodiments thereof in detail with reference to the accompanying drawings, in which.

DETAILED DESCRIPTION OF THE EMBODIMENTS

The invention will be described more fully hereinafter with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that although the terms "first," "second," "third", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention. The terminology used herein is for the purpose of describing particular embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top", may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The terms "below" or "beneath" can, therefore, encompass both an orientation of above and below. Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Embodiments of the present invention are described herein with reference to cross-sectional illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

First, an electrophoretic display will be described with reference to FIGS. 1 to 3 as an example of a display device according to an embodiment of the present invention.

Figure 1:
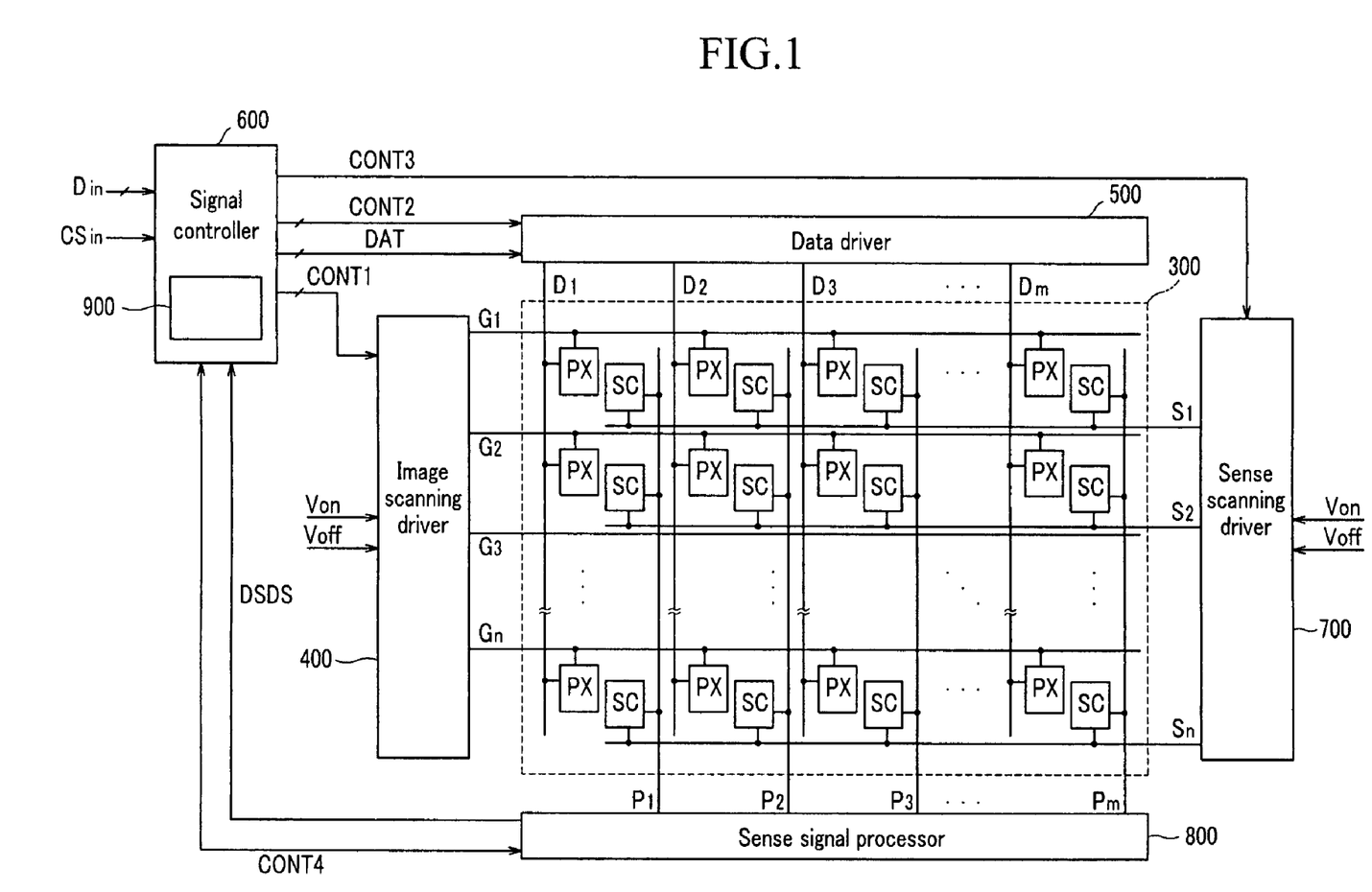
FIG. 1 is a block diagram of an electrophoretic display device according to an embodiment of the present invention.
Figure 2:
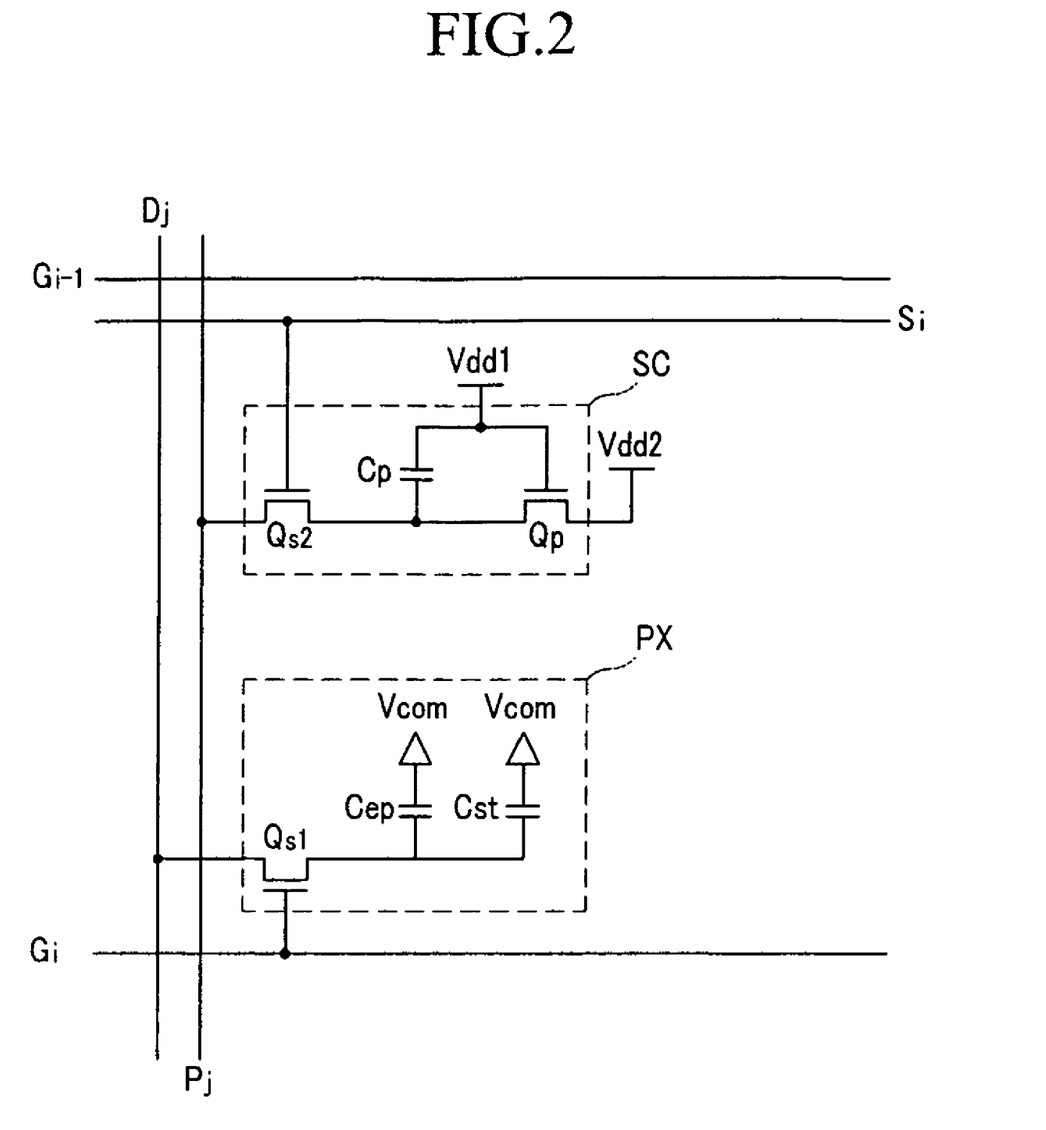
FIG. 2 is an equivalent circuit diagram of a pixel and a sensing unit in an electrophoretic display device according to an embodiment of the present invention.
Figure 3:
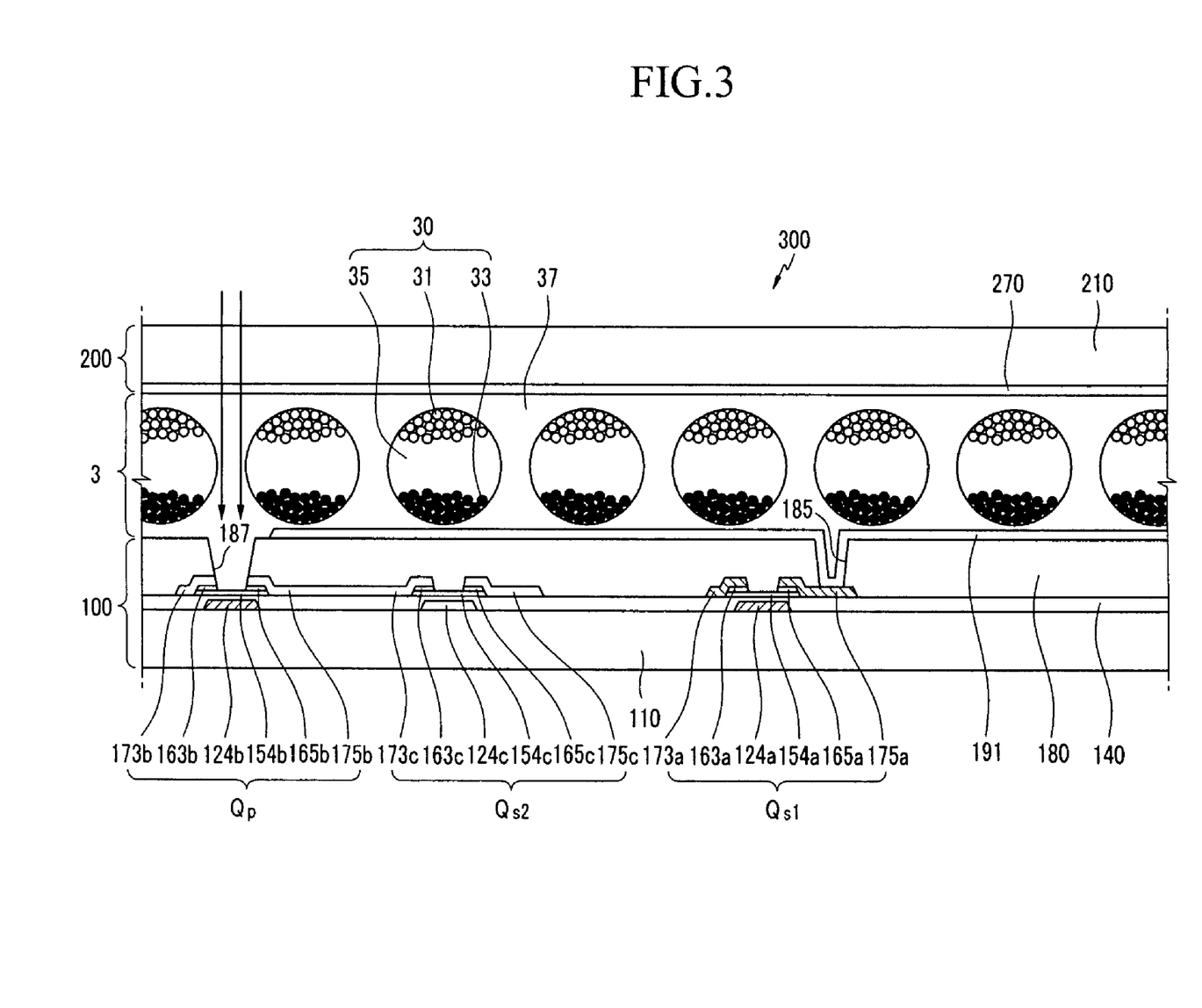
FIG. 3 is a cross-sectional view of a display panel assembly of an electrophoretic display device according to an embodiment of the present invention.

FIG. 1 is a block diagram illustrating an electrophoretic display device according to an embodiment of the present invention, FIG. 2 is an equivalent circuit diagram of a pixel and a sensor in an electrophoretic display device according to an embodiment of the present invention, and FIG. 3 is a cross-sectional view of a display panel assembly of an electrophoretic display according to an embodiment of the present invention.

As shown in FIG. 1, the electrophoretic display according to an embodiment includes an electrophoretic panel assembly 300, an image scanning driver 400, a data driver 500, a sense scanning driver 700, a sense signal processor 800, and a signal controller 600.

As shown in the equivalent circuit diagram of FIG. 2, the electrophoretic display panel assembly 300 includes a plurality of display signal lines $G_1$-$G_n$ and $D_1$-$D_m$, a plurality of sense signal lines $S_1$-$S_n$ and $P_1$-$P_m$, and a plurality of pixels PX and a plurality of sensing units SC, which are arranged basically in a matrix pattern. Further, as shown in FIG. 3, the electrophoretic display panel assembly 300 includes respective lower and upper panels 100 and 200 facing each other, and an electrophoretic layer 3 interposed between the lower and upper panels 100 and 200.

The display signal lines $G_1$-$G_n$ and $D_1$-$D_m$ are formed on an insulation substrate 110, which is made of transparent glass or plastic, in one example. The display signal lines include a plurality of image scanning lines $G_1$-$G_n$ for transferring an image scanning signal and a plurality of image data lines $D_1$-$D_m$ for transferring an image data voltage. The image scanning lines $G_1$-$G_n$ extend substantially in a row direction to run almost parallel to each other, and the image data lines $D_1$-$D_m$ extend substantially in a column direction to run almost parallel to each other.

The sensing signal lines $S_1$-$S_n$ and $P_1$-$P_m$ are also formed on the insulation substrate 110, and include a plurality of sense scanning lines $S_1$-$S_n$ for transmitting a sense scanning signal and a plurality of sense data lines $P_1$-$P_m$ for transmitting a sense data signal. The sense scanning lines $S_1$-$S_n$ extend substantially in a row direction to run almost parallel to each other, and the sense data lines $P_1$-$P_m$ extend substantially in a column direction to run almost parallel to each other.

As shown in FIGS. 2 and 3, each pixel PX, for example a pixel PX connected to an i-th image scanning line $G_i$ and a j-th image data line $D_j$, includes a switching element Qs1 connected to the display signal lines $G_i$ and $D_j$, and an electrophoretic capacitor Cep and a storage capacitor Cst that are connected to the switching element Qs1, where i=1, 2, ..., n and j=1, 2, ..., m.

The switching element Qs1 is a three terminal element such as a thin film transistor disposed on the lower panel 100. The switching element Qs1 includes a control terminal 124a connected to an image scanning line $G_i$, an input terminal 173a connected to an image data line $D_j$, and an output terminal 175a connected to an electrophoretic capacitor Cep and a storage capacitor Cst. Also, the switching element Qs1 includes a semiconductor 154a formed between the control terminal 124a and the input terminal 173a and between the control terminal 124a and the output terminal 175a, and ohmic contacts 163a and 165a formed on the semiconductor 154a.

The electrophoretic capacitor Cep includes one of a plurality of pixel electrodes 191 of the lower panel 100 and a common electrode 270, which is formed on an insulating substrate of the upper panel 200, as two terminals. An electrophoretic layer 3 disposed between the two electrodes 191 and 270 operates as a dielectric material.

One pixel electrode 191 is connected to one switching element Qs1. The common electrode 270 is formed on the entire surface of the upper panel 200 and receives a common voltage Vcom. The pixel electrodes 191 are made of a transparent conductor or an opaque metal such as ITO or IZO, and the common electrode 270 is made of a transparent conductor. A passivation layer 180 is interposed between the pixel electrodes 191 and the switching elements Qs1. The pixel electrodes 191 are connected to the output terminals 175a of the switching elements Qs1 through contact holes 185 of the passivation layer 180, respectively.

The electrophoretic layer 3 includes a plurality of microcapsules 30 and a binder 37 for fixing the microcapsules 30. Each of the microcapsules 30 includes a white electrophoretic particle 31 charged with a negative charge (−) or a positive charge (+), a black electrophoretic particle 33 charged with the opposite charge, and a transparent dielectric fluid 35.

The storage capacitor Cst includes the pixel electrode 191 and a separate signal line (not shown), which is provided on the lower panel 100, overlaps the pixel electrode 191 via an insulator, and is supplied with a predetermined voltage such as the common voltage Vcom. Alternatively, the storage capacitor Cst includes the pixel electrode 191 and an adjacent image scanning line called a previous image scanning line, which overlaps the pixel electrode 191 via an insulator.

Each of the sensing units SC, for example a sensing unit SC connected to an i-th sense scanning line Si and a j-th sense data line Pj, includes a sensing element Qp, a switching element Qs2, and a sense capacitor Cp, where i=1, 2, ..., n and j=1, 2, ..., m. The sensing units SC are formed on the lower panel 100 and are mostly covered by a passivation layer 180.

The sensing element Qp is a three terminal element such as a thin film transistor. The sensing element Qp includes a control terminal 124b connected to a sensing control voltage Vdd1, an output terminal 175b connected to one end of a capacitor Cp and an input terminal 173c of a switching element Qs2, and an input terminal 173b connected to a sensing input voltage Vdd2. The sensing element Qp further includes a semiconductor 154b formed between a control terminal 124b and an input terminal 173b, and between a control terminal 124b and an output terminal 175b. Ohmic contacts 163b and 165b are formed on the semiconductor 154b. When light is radiated to the semiconductor 154b of the sensing element Qp through an exposure hole 187 formed on the passivation layer 180, an optical current is formed. The optical current flows to the sensing capacitor Cp and the switching element Qs2 by a voltage difference between the input terminal 173b and the output terminal 175b.

The sensing capacitor Cp includes one end connected to a sensing control voltage Vdd1 and the other end connected to an output terminal 175b of a sensing element Qp and an input terminal 173c of a switching element Qs2. The sensing capacitor Cp accumulates a charge according to an optical current from the sensing element Qp to sustain a predetermined voltage.

Also, the switching element Qs2 is a three terminal element such as a thin film transistor. The switching element Qs2 includes a control terminal 124c connected to a sense scanning line Si, an output terminal 175c connected to a sense data line Pj, and an input terminal 173c connected to an output terminal 175b of a sensing element Qp. The switching element Qs2 further includes a semiconductor 154c formed between a control terminal 124c and an input terminal 173c and between a control terminal 124c and an output terminal 175c. Ohmic contacts 163c and 165c are formed on the semiconductor 154c. The switching element Qs2 outputs a voltage stored in a sensing capacitor Cp or an optical current from a sensing element Qp to a sense data line Pj as a sense data signal when a sense scanning signal is applied.

The semiconductors 154a, 154c, and 154b of the switching elements Qs1 and Qs2 and the sensing element Qp may be formed of an amorphous silicon or polysilicon thin film transistor.

The ohmic contacts 163a, 163b, 163c, 165a, 165b, and 165c may be made of n+ hydrogenated a-Si heavily doped with an N-type impurity, or they may be made of silicide. The control terminals 124a, 124b, and 124c and the semiconductors 154a, 154b, and 154c of the switching elements Qs1 and Qs2 and the sensing element Qp are insulated from each other by a gate insulating layer 140 made of silicon nitride (SiNx) in one example.

Although the pixels PX and the sensing units SC are described to be identical in number, the number of sensing units SC may be smaller than the number of pixels PX. Accordingly, the number of sense scanning lines $S_1$-$S_n$ and sense data lines $P_1$-$P_m$ may be variable.

The sense scanning driver 700 is connected to the sense scanning lines $S_1$-$S_n$, and applies a sense scanning signal to the sense scanning lines $S_1$-$S_n$. A voltage for turning on the switching elements Gs2 (referred to as a "turn-on voltage") and a voltage for turning off the switching elements Gs2 (referred to as a "turn-off voltage") are synthesized to generate a sense scanning signal.

The sense signal processor 800 is connected to the data lines $P_1$-$P_m$ and converts analog sense data signals from the sense data lines $P_1$-$P_m$ into digital sense data signals DSDS.

The signal controller 600 controls the image scanning driver 400, the data driver 500, the sense scanning driver 700, and the sense signal processor 800 in accordance with control signals (not shown). In addition, the signal controller 600 controls a contact position determiner 900 to determine a contact position based on the digital sense data signals DSDS from the sense signal processor 800. An operation of the contact position determiner 900 is described later.

The image scanning driver 400 is connected to image scanning lines $G_1$-$G_n$ for applying image scanning signals to the image scanning lines $G_1$-$G_n$. Each of the image scanning signals includes a voltage Von (referred to as a "gate-on voltage") for turning on the switching elements Qs1 and a voltage Voff (referred to as a "gate-off voltage") for turning off the switching elements Qs1.

The data driver 500 is connected to the image data lines $D_1$-$D_m$ of the panel assembly 300 and applies image data voltages to the data lines $D_1$-$D_m$.

At least one of the image scanning driver 400, the data driver 500, the sense scanning driver 700, and the sense signal processor 800 may be integrated into the panel assembly 300 along with the display signal lines $G_1$-$G_n$ and $D_1$-$D_m$, the sense signal lines $S_1$-$S_n$ and $P_1$-$P_m$, the switching elements Qs1 and Qs2, and the sensing units SC. Alternatively, at least one of the image scanning driver 400, the data driver 500, the sense scanning driver 700, and the sense signal processor 800 may include at least one integrated circuit (IC) chip mounted on the LC panel assembly 300 or on a flexible printed circuit (FPC) film in a tape carrier package (TCP) type, which are attached to the panel assembly 300.

Meanwhile, the electrophoretic display device further includes a gray voltage generator for generating gray voltages and providing the generated gray voltages to the data driver 500. In this case, the data driver 500 applies gray voltages or divided gray voltages to the image data lines $D_1$-$D_m$ as image data voltages.

Hereinafter, the display operation and the optical sense operation of the above electrophoretic display device will be described in detail.

The signal controller 600 receives input image signals Din from an external graphics controller (not shown), input control signals CSin for controlling the display of the input image signals, which are the digital sense data signals DSDS from the sense signal processor 800. For example, the input control signals CSin include a vertical synchronization signal, a horizontal synchronizing signal, a main clock signal, etc.

The signal controller 600 appropriately processes the input image signals Din to be suitable for the operation of the electrophoretic display panel assembly 300 based on the input image signals Din and the input control signals CSin, and generates gate control signals CONT1, data control signals CONT2, sense scanning control signals CONT3, sense process control signals CONT4, and output image signals DAT. Then, the signal controller 600 transmits the gate control signals CONT1 to the image scanning driver 400, the data control signals CONT2 and the output image signals DAT to the data driver 500, the sense scanning control signals CONT3 to the sense scanning driver 700, and the sense process control signals CONT4 to the sense signal processor 800. In addition, the sense process control signals CONT4 are generated by the sense signal processor 800 to transmit to the signal controller 600.

The signal controller 600 also determines a contact position based on the digital sense data signals DSDS.

The image scanning control signals CONT1 include a scanning start signal STV for instructing to start scanning of an image scanning signal, and at least one clock signal CLK for controlling the output of the image scanning signal. The image scanning control signal CONT1 further includes an output enable signal OE for limiting the duration of a gate-on voltage Von.

The image data control signals CONT2 include a horizontal synchronization start signal STH for informing the data transmission of one pixel row, a load signal LOAD for applying corresponding image data voltages to the image data lines $D_1$-$D_m$, and a data clock signal HCLK.

The sense scanning control signals CONT3 include a scanning start signal for instructing to start scanning of a sense scanning signal, and at least one clock signal for controlling the output of the sense scanning signal. The sense scanning control signals CONT3 further include a control signal for limiting the duration of a turn-on voltage. In this embodiment, the turn-on voltage and the turn-off voltage are the same as the gate-on voltage Von and the gate-off voltage Voff, respectively. However, in an alternative embodiment, the turn-on voltage and the turn-off voltage may be different from the gate-on voltage Von and the gate-off voltage Voff, respectively.

The sense process control signals CONT4 include a control signal for informing a reading time of the sense data signals of a sensing unit row. The sense process control signals CONT4 also include a transmission start signal for informing the transmission of the sense data signals of a sensing unit row, a control signal for applying the sense data signals from the sense data lines $P_1$-$P_m$ to the signal controller 600, clock signals, etc. At this time, the transmission start signal may be the horizontal synchronization start signal STH, and the control signal may be the load signal LOAD.

Responsive to the data control signals CONT2 from the signal controller 600, the data driver 500 receives a packet of the digital output image signals DAT for one pixel row from the signal controller 600, converts the digital output image signals DAT into analog image data voltages selected from the gray voltages, and applies the analog data voltages to the image data lines $D_1$-$D_m$.

The image scanning driver 400 applies the gate-on voltage Von to an image scanning line $G_1$-$G_n$ in response to the image scanning control signals CONT1 from the signal controller 600, thereby turning on the switching elements Qs1 connected thereto. The image data voltages applied to the image data lines $D_1$-$D_m$ are then supplied to the pixels PX through the activated switching elements Qs1.

A difference between an image data voltage and the common voltage Vcom applied to a pixel PX is represented as a voltage across the electrophoretic capacitor Cep of the pixel PX, which is referred to as a pixel voltage. The locations of the electrophoretic particles 31 and 33 vary in the microcapsule 30 according to a magnitude of the pixel voltage, a polarity of the pixel voltage, a time of applying the pixel voltage, etc.

For example, if a white electrophoretic particle 31 is located closer to the common electrode 270, the electrophoretic display device displays white. On the contrary, if a black electrophoretic particle 33 is located closer to the common electrode 270, the electrophoretic display device displays black. If white and black electrophoretic particles 31 and 33 are located in the middle of a microcapsule 30, the electrophoretic display device displays a gray level. As described above, the electrophoretic display device displays various gray-scale images by changing the locations of the electrophoretic particles 31 and 33 in a microcapsule 30.

When a predetermined period (one period of a horizontal synchronizing signal Hsync, and a data enable signal DE) passes, the image data driver 500 and the image scanning driver 400 repeatedly perform the same operation for the next row of pixels. As described above, a gate-on voltage Von is sequentially applied to the image scanning lines $G_1$-$G_n$, thereby applying image data voltages to the pixels PX.

The sense scanning driver 700 applies a turn-on voltage to a sense scanning line $S_1$-$S_n$ based on the sense scanning control signals CONT3 from the signal controller 600 to turn on the switching elements Qs2 of the sensing units SC connected to the sense scanning line $S_1$-$S_n$. Thereby, voltages charged in the sensing capacitors Cp or photo-currents from the sensing elements Qp of the sensing units SC connected to the sense scanning line $S_1$-$S_n$ are applied to the sense data lines $P_1$-$P_m$ as the sense data signals, respectively.

When a predetermined period (one period of a horizontal synchronizing signal Hsync, and a data enable signal DE) passes, the sense scanning driver 700 and the sense signal processor 800 repeatedly perform the same operation for the next sensing unit row. As described above, a turn-on voltage is sequentially applied to the sense scanning lines $S_1$-$S_n$, and thereby the sense signal processor 800 receives sense data signals of all the sensing units SC.

After amplifying or filtering the received sense data signals, the sense signal processor 800 converts the processed sense data signals into digital sense data signals DSDS to transmit to the signal controller 600. As described above, the sense signal processor 800 sequentially receives the analog sense data signals in a unit of sensing unit rows, converts them into the digital sense data signals DSDS, and transmits the converted digital sense data signals DSDS to the signal controller 600.

The contact position determiner 900 of the signal controller 600 receives the digital sense data signals DSDS from the sense signal processor 800 to determine a contact position and to output contact information such as the contact position to an external device.

Next, the operation of the contact position determiner 900 will be described in detail with reference to FIGS. 4 to 8.

Figure 4:
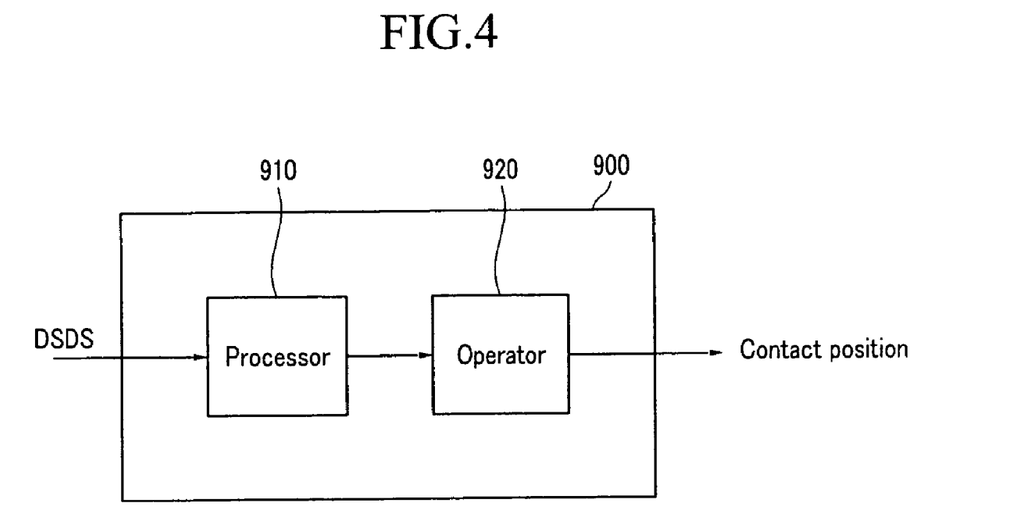
FIG. 4 is a block diagram of a contact position determiner according to an embodiment of the present invention.

Referring to FIG. 4, a structure of the contact position determiner 900 will be now described.

FIG. 4 is a block diagram of a contact position determiner according to an embodiment of the present invention. The contact position determiner 900 according to an embodiment of the present invention includes a processor 910 and an operator 920. The contact position determiner 900 sequentially receives the digital sense data signals DSDS from the sense signal processor 800 in a unit of sensing unit rows to determine a contact position.

The processor 910 converts the digital sense data signals DSDS received from the sense signal processor 800 into preliminary signals to sequentially output them to the operator 920. Each of the preliminary signals has a value of "0" or "1". At this time, the bit number of the respective preliminary signals may be "1".

The respective digital sense data signals DSDS generally have 8-bit data, and thereby the number of magnitudes of digital sense data signals DSDS is 256 (=$2^8$, 0-255). The magnitude of the digital sense data signal DSDS is defined based on a light amount applied to the sensing element Qp. As the magnitude of the digital sense data signal DSDS becomes close to "0", the sensed light amount becomes less, that is, darker, while as the magnitude of the digital sense data signal DSDS becomes close to "255", the sensed light amount becomes larger, that is, brighter. However, the relationship of the light amount and the magnitude of the digital sense data signal DSDS may be varied. When a finger of a human or a touch pen is touched on the display panel assembly 300, the sensing units SC near a contact position are generally dark, and the remaining sensing units SC are bright. That is, the digital sense data signals DSDS from the sensing units SC near the contact position have magnitudes close to "0". However, since the finger or the touch pen may not be perfectly physically contacted with the sensing units SC, light from the display panel assembly 300 may not be entirely blocked by the finger or the touch pen, and thereby the digital sense data signals DSDS from the contact position may not have the lowest magnitude of "0". Further, even though digital sense data signals DSDS having a magnitude close to or equal to the lowest magnitude of "0" are outputted, the digital sense data signals DSDS may be under the influence of noise.

Therefore, the digital sense data signals DSDS included in a predetermined range (referred to as "a contactable range") of 0 to 255, for example a range of 150 to 200, are defined as signals from the sensing units SC in which a touch occurs (referred to as "touchable sensing units"). In addition, the digital sense data signals DSDS having the magnitudes that are not included in the contactable range are defined as signals from the sensing units SC in which a touch does not occur (referred to as "untouchable sensing units).

The processor 910 converts the digital sense data signals DSDS included in the contactable range into preliminary signals having a value of "1", and the remaining digital sense data signals DSDS into preliminary signals having a value of "0" to output to the operator 920. In the rest, an area that preliminary signal has a value "1" is mentioned as a sensed area.

The operator 920 determines a contact position based on the preliminary signals from the processor 910.

Next, an operation of the operator 920 will be described with reference to FIGS. 5 to 8.

First, referring to FIGS. 5 and 6, a concept for determining a contact position will be described.

Figure 5:
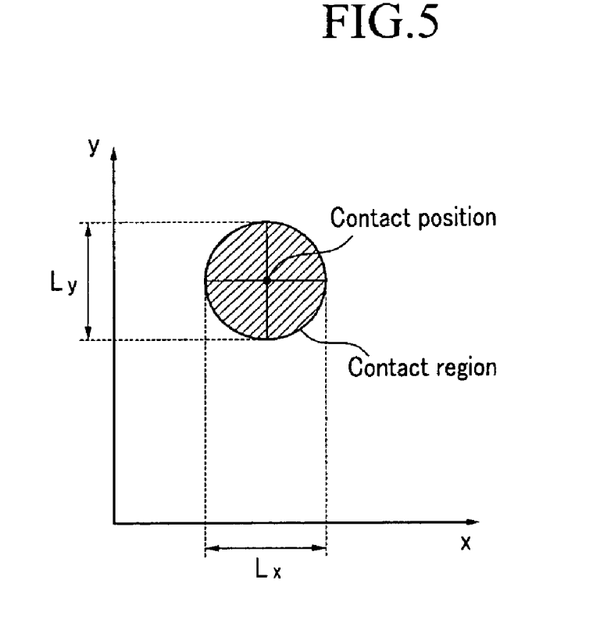
FIG. 5 is a schematic view of a contact region.
Figure 6:
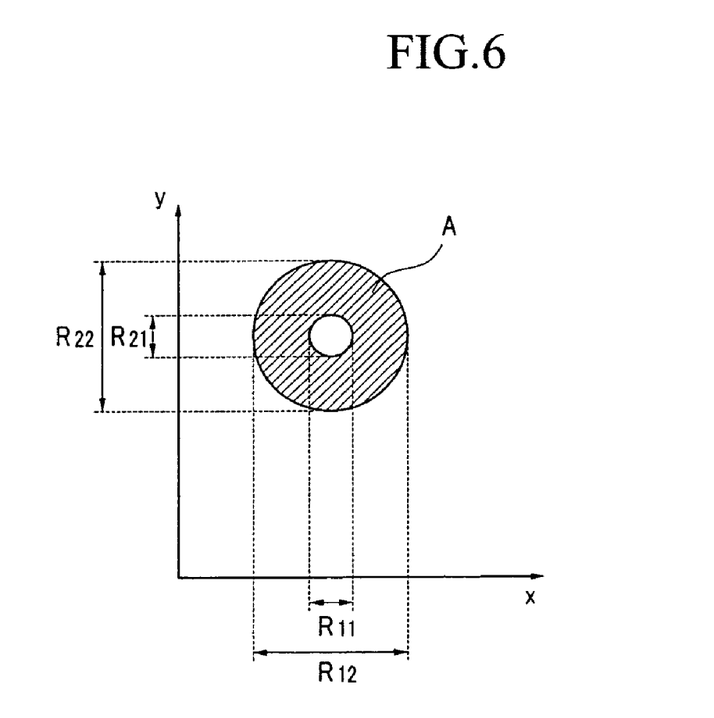
FIG. 6 is a schematic view indicating a range regarded as a contact region.

FIG. 5 is a schematic view of a contact region, and FIG. 6 is a schematic view indicating a sensed area regarded as a contact region.

A contact region of a finger or a touch pen has a certain shape, and a contact region having the certain shape is shown in FIG. 5. The shape of the contact region is generally close to circular such as an elliptical shape. In addition, the center of the contact region is determined as a contact position.

Referring to FIG. 5, in a plane of two dimensions having an X axis and a Y axis, the contact region has an X axis length Lx and a Y axis length. When the size of the sensed area is too wide, it is impossible to determine the contact region of the sensed area, while when the size of the sensed area is too narrow, the digital sense data signals DSDS from the sensed area include a large amount of noise. Thereby, the sensed area should have an appropriate size. When the sensed area is included in an appropriate range, the sensed area is determined as a contact region.

The appropriate range of the sensed area that is capable of being determined as the contact region is shown in FIG. 6.

When the size of the sensed area is included in an "A" portion, the sensed area is determined as the contact region. An effective range of the X axis length Lx and the Y axis length Ly for a determination as the contact region of the sensed area is defined as in Equation 1.

$$R11 < Lx < R12$$
$$R21 < Ly < R22 \quad \text{[Equation 1]}$$

The lower limits R11 and R21 and the upper limits R12 and R22 may be obtained by experiment.

Thus, when the X axis length Lx and the Y axis length Ly of the sensed area are included in the effective range, the sensed area is determined as a contact region, and then the center of the sensed area is defined as a contact position.

Next, an operation of the operator 920 for determining a contact position will be described with reference to FIGS. 7 and 8.

Figure 7:
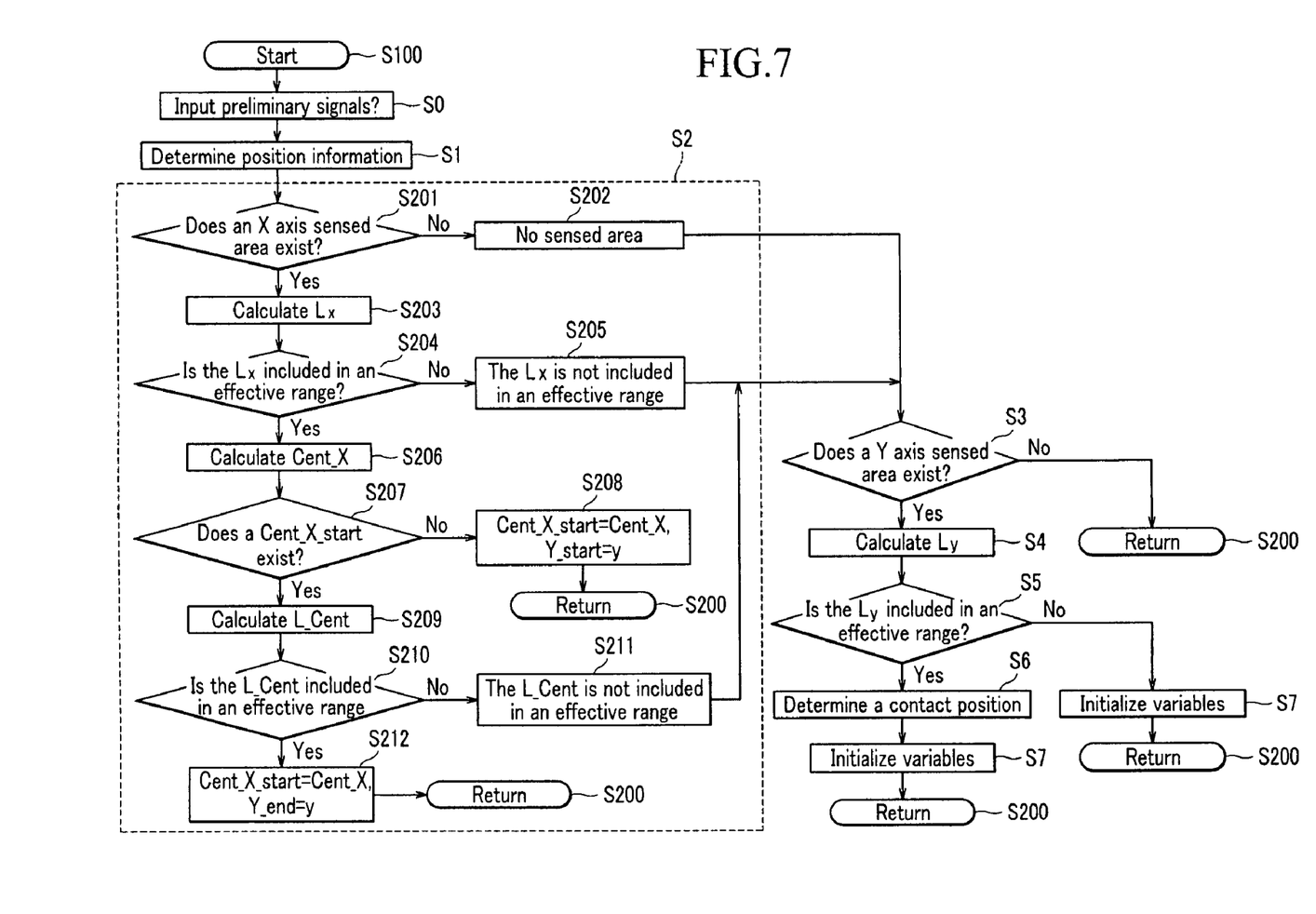
FIG. 7 is a flowchart of an operation of an operator according to an embodiment of the present invention.
Figure 8:
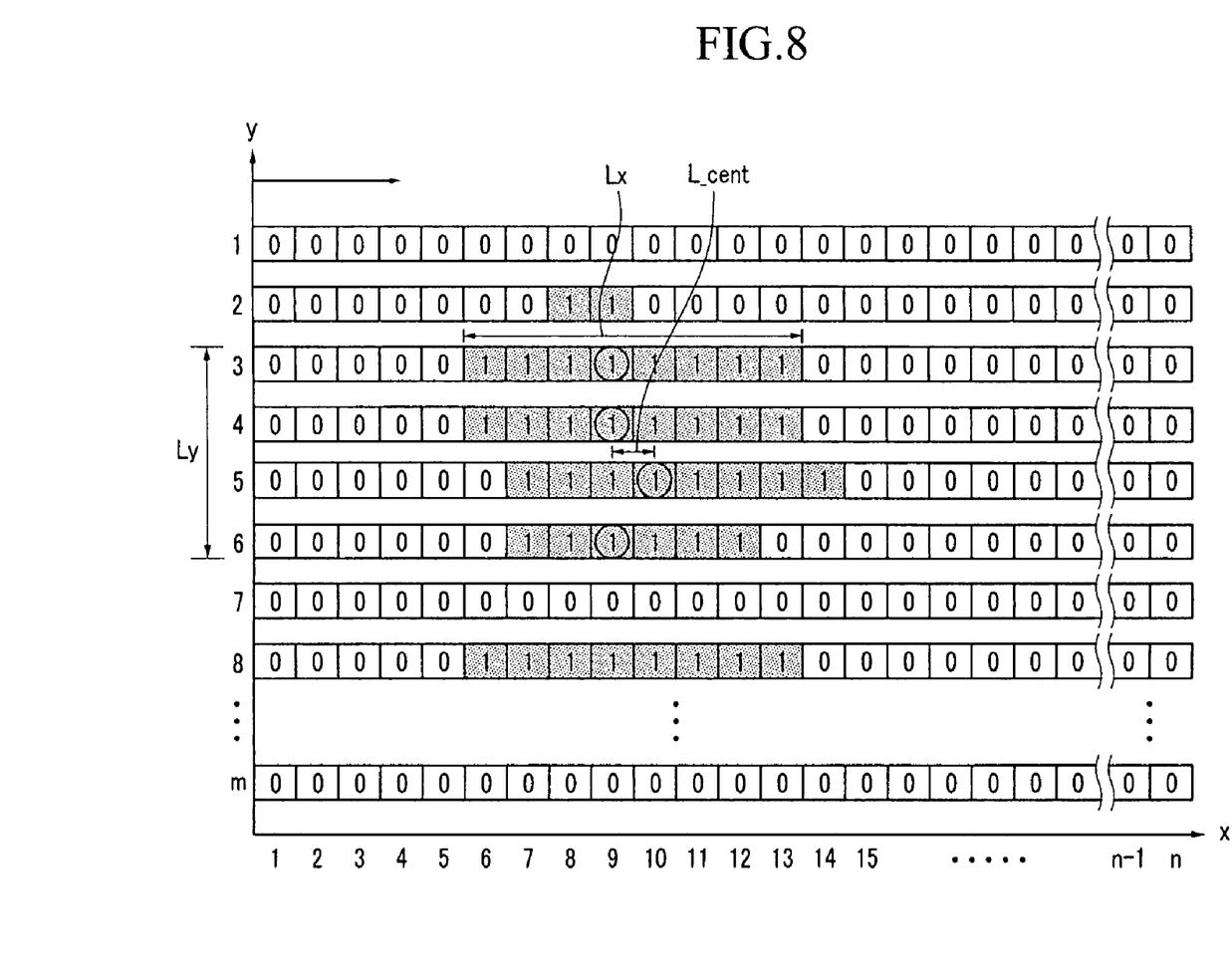
FIG. 8 is an example of preliminary signals according to an embodiment of the present invention.

FIG. 7 is a flowchart of an operation of an operator according to an embodiment of the present invention, and FIG. 8 is an example of preliminary signals according to an embodiment of the present invention.

First, when the operation of the operator 920 starts (S100), the operator 920 sequentially receives preliminary signals for one sensing unit row from the processor 910 (S0).

At this time, the operator 920 sequentially determines a position of the sensing unit SC representing each read preliminary signal and sensed area (S1). At this time, a position of the respective sensing units is represented by an X axis value and a Y axis value.

For example, a position value of the first sensing unit of the first sensing unit row is X=1 and Y=1, a position value of the second sensing unit of the first sensing unit row is X=2 and Y=1, and a position value of the first sensing unit of the second sensing unit row is X=1 and Y=2.

In addition, for determining the preliminary signals for one sensing unit row, which are sequentially input, the operator 920 counts the number of preliminary signals from a first preliminary signal. That is, when the counted number is a predetermined number n, it is determined that the input of the preliminary signals for one sensing unit row is terminated. Thereby, the number of preliminary signals for the next sensing unit row is counted from "1" to determine the preliminary signals for the next sensing unit row.

In addition, the operator 920 determines whether an X axis sensed area exists in a sensing unit row, in comparison with values of two adjacent preliminary signals. That is, when a value of a sequentially inputted preliminary signal is changed from "0" to "1", the operator 920 determines that the X axis sensed area starts, and thereby the operator 920 stores the X axis position, in which the value of the preliminary signal is changed as an X axis sensed area start position, in a memory such as a buffer. In addition, when a value of a preliminary signal sequentially inputted is changed from "1" to "0", the operator 920 determines that the X axis sensed area ends, and thereby the operator 920 stores the X axis position, in which the value of the preliminary signal is changed as an X axis sensed area end position, in the memory. At this time, all of the values of the preliminary signals in the X axis sensed area are "1".

As described above, in the step S2, the operator 920 determines whether the X axis sensed area exists or not and whether the X axis sensed area is effective or not.

Thereby, the operator 920 determines whether the X axis sensed area exists (S201).

When the X axis sensed area does not exist, the operator 920 generates a signal indicating that the X axis sensed area does not exist to output (S202), and then determines whether a Y axis sensed area exists (S3). Alternatively, the operator 920 may change a value of a flag indicating that the X axis sensed area does not exist.

However, when the X axis sensed area exists (S201), the operator 920 calculates an X axis length Lx (S203), and determines whether the calculated X axis length Lx is included in an effective range (S204). The X axis length Lx may be obtained based on the X axis sensed area start position and the X axis sensed area end position. That is, the operator 920 calculates the X axis length Lx by using subtraction and addition based on the stored X axis sensed area start position and the stored X axis sensed area end position.

When the calculated X axis length Lx is not included in the effective range, the operator 920 generates a signal indicating that the calculated X axis length Lx is not included in the effective range to output (S205), and then determines whether a Y axis sensed area exists (S3). Alternatively, the operator 920 may change a value of a flag indicating that the calculated X axis length Lx is not included in the effective range.

However, in an alternative embodiment, the operator 920 may go directly to the step S3 after skipping the steps S202 and S205.

In the step S204, when the calculated X axis length Lx is included in the effective range, the operator 920 calculates an X axis center position value Cent_X (S206).

In this embodiment, the X axis center position value Cent_X may be calculated as below.

When the number of sensing units included in the X axis sensed area is an odd number, a position of the sensing unit positioned in the center of the X axis sensed area is defined as the X axis center position value Cent_X. However, when the number (q) of sensing units included in the X axis sensed area is an even number, a position of one of two sensing units positioned in center portions [q/2, (q/2)+1] of the X axis sensed area is defined as the X axis center position value Cent_X.

When the X axis center position value Cent_X is calculated, the operator 920 determines whether a previous X axis center position value Cent_X calculated based on preliminary signals for a previous sensing unit row exists. Thereby, the operator 920 determines whether a value stored as an X axis center start position value Cent_X_start exists in a memory such as a buffer etc.

When the X axis center start position value does not exist, the operator 920 stores the X axis center position value Cent_X calculated in the step S206 as the X axis center start position value Cent_X_start, and also stores the current Y axis value as a Y axis start position value Y_start. However, in the step S207, when the stored X axis center position value Cent_X exists, the operator 920 calculates a difference between the stored X axis center position value Cent_X and the X axis center position value Cent_X calculated in the step S206 to define an inter-center position length L_cent.

When a sensed area is included in the same contact region, the center positions of the sensed areas of each of the sensing unit rows that are included in the sensed area are included in a predetermined distance.

The inter-center position length L_cent included in one contact region satisfies Equation 2

$$L\_cent < R3 \quad \text{[Equation 2]}$$

wherein an upper limit R3 may be obtained by experiment.

Thereby, the operator 920 determines whether the calculated inter-center position length L_cent is included in an effective range defined in Equation 2 (S210).

When the inter-center position length L_cent is not included in the effective range, the operator 920 generates a signal indicating that the inter-center position length L_cent is not included in the effective range to output (S211), and then determines whether the Y axis sensed area exists (S3). Alternatively, the operator 920 may change a value of a flag indicating that the inter-center position length L_cent is not included in the effective range. The step S211 may also be omitted. However, when the inter-center position length L_cent is included in the effective range, the operator 920 stores the current Y axis value as a Y axis end value Y_end, updates the X axis center start position value Cent_X_start into the X axis center position calculated in the step S206 (S212), and then goes to step S200 to process preliminary signals for the next sensing unit row.

As described above, after the step S202, S205, or S211, the operator 920 goes to the step S3 for determining whether the Y axis sensed area exists (S3).

Thereby, the operator 920 determines whether the Y axis end position value Y_end exists.

That is, when the stored Y axis end position value Y_end is the initial value, the operator 920 goes to step S200 to process preliminary signals for the next sensing unit row.

However, if the stored Y axis end position value Y_end is not the initial value, the operator 920 calculates a Y axis length Ly (S4). Therein, the operator 920 reads the Y axis start position value Y_start to calculate a difference between the Y axis end position value Y_end and the Y axis start position value Y_start as the Y axis length Ly. Next, the operator 920 determines whether the calculated Y axis length Ly is included in an effective range (S5).

When the Y axis length Ly is included in the effective range, the operator 920 defines the sensed area as the contact region and thereby determines a contact position of the contact region (S6).

Thereby, the operator 920 defines the X axis center start position value Cent_X_Start as an X coordinate of the contact position, and the center position of the Y axis start position value Y_start and the Y axis end value Y_end as a Y coordinate of the contact position. Then, the operator 920 initializes variables and goes to the step S200. When the center position is two, either of the two may be the center position.

However, when the Y axis length Ly is not included in the effective range, the operator 920 initializes the variables and goes to the step S200.

Referring to FIG. 8 illustrating preliminary signals, a calculation manner of a contact position based on the preliminary signals will be described in detail according to the flowchart shown in FIG. 7.

FIG. 8 is an example of preliminary signals according to an embodiment of the present invention. In FIG. 8, the preliminary signals are input to the operator 920 in an arrow direction. It is assumed that a range of an X axis length Lx is 2<Lx<9, and a range of a Y axis length Ly is 2<Ly<9. In addition, it is assumed that a range of an inter-center position length L_cent is L_cent<2. Herein, the unit is the number of sensing units.

Since the set of the preliminary signals shown in FIG. 8 includes m rows and n columns, while the preliminary signals for the one sensing unit row are input, a Y axis value maintains an appropriate value m and an X axis value sequentially increases from 1 to n.

First, when sequentially inputting preliminary signals for a first sensing unit row (S0), the operator determines a position of the preliminary signal and whether an X axis sensed area exists (S1 and S201).

However, since the preliminary signals having a value of "1" do not exist, the operator 920 sequentially receives preliminary signals for the next sensing unit row after steps S202, S3, and S200.

As shown in FIG. 8, since the 8-th and 9-th preliminary signals have a value of "1", an X sensed area exists.

Thereby, the operator 920 calculates the X axis length Lx (S203). However, since the calculated X axis length Lx is "2", that is not included in the effective range 2<Lx<9 (S204), the operator 920 receives preliminary signals for the third sensing unit row after steps S205, S3, and S200.

Referring to FIG. 8, since the 6-th to 13-th preliminary signals have a value of "1", the X sensed area exists, and the X axis length Lx is "8" that is included in the effective range (2<Lx<9).

Thus, the operator 920 calculates an X axis center position value Cent_X (S206). The calculated X axis center position Cent-X is 9. At this time, since the X axis center start position value Cent_X_start has an initial value, the operator 920 stores the calculated X axis center position Cent-X "9" as the X axis center start position value Cent_X_start, and stores a current Y axis value "3" as a Y axis start position value Y_start. Thereby, the operator 920 receives preliminary signals for the fourth sensing unit row after steps S3 and S200.

Referring to FIG. 8, the preliminary signals for the fourth sensing unit row are the same as those of third sensing unit row. Thereby, the operator 920 calculates an inter-center position length L_Cent after the steps S201, S203, S204, S206, and S207.

At this time, since the X axis center positions of the third and fourth sensing unit rows are "9", the calculated inter-center position length L_Cent is "0", and the calculated inter-center position length L_Cent is included in the effective range (L_Cent<2).

Thereby, the operator 920 stores the current Y axis value "4" as a Y axis end position value Y_end S212 and updates the X axis center start position value Cent_X_Start, and then receives preliminary signals for the fifth sensing unit row (S200).

Referring to FIG. 8, since the preliminary signals for the fifth sensing unit row have the value of "1" from the 7-th to 14-th preliminary signals, the X sensed area exists, and the X axis length Lx is "8" that is included in the effective range (2<Lx<9). In addition, since the X axis center position is "10", the inter-center position length (L_Cent=1) is included in the effective range.

Thereby, the operator 920 stores the current Y axis value "5" as a Y axis end position value Y_end and updates the X axis center start position value Cent_X_Start to "10", and then receives preliminary signals for the sixth sensing unit row (S200).

Referring to FIG. 8, since the preliminary signals for the sixth sensing unit row have the value of "1" from the 7-th to 12-th preliminary signals, the X sensed area exists, and the X axis length Lx is "6" that is included in the effective range (2<Lx<9). In addition, since the X axis center position is "9", the inter-center position length (L_Cent=1) is included in the effective range.

Thereby, the operator 920 stores the current Y axis value "6" as a Y axis end position value Y_end and updates the X axis center start position value Cent_X_Start to "9", and then receives preliminary signals for the seventh sensing unit row (S200).

Values of the preliminary signals for the seventh sensing unit row are all "0". Thereby, the operator 920 determines whether a Y axis sensed area exists (S3).

At this time, since the Y axis end position value Y_end is "6" and not an initial value, the operator 920 calculates a Y axis length Ly. The calculated Y axis length Ly is "4" that is included in the effective range (2<Ly<9).

Thereby, the operator 920 defines "9" that is the stored X axis center position value Cent_X as an X coordinate and "4" or "5" that is the center portions of the Y axis length Ly, and then initializes variables. Then the operator 920 receives preliminary signals for the eighth sensing unit row.

As described above, the operator 920 determines a contact position based on the preliminary signals for the eighth sensing unit row.

According to the embodiment, the contact position determiner 900 processes the digital sense data signals received for every sensing unit row unit and determines a contact position. Thereby, the embodiment requires a storing area for storing only the operation results and not a memory having a large capacity for storing the digital sense data signals from all the sensing units.

Therefore, since the capacity of the memory decreases, the manufacturing cost is reduced, and the contact position is exactly and rapidly determined.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A driving method of a display device, comprising:
   reading sense data signals of a first sensing unit row, the sense data signals being sequentially input;
   determining for each sense data signal whether the sense data signal is included in a contactable range;
   converting each sense data signals into a preliminary signal, each preliminary signal having a predetermined value based on whether the sense data signal is included in the contactable range;
   determining whether the first sensing unit row includes an X axis sensed area using the preliminary signals;
   determining whether the X axis sensed area is in an effective contact region when the X axis sensed area is present;
   determining whether a Y axis sensed area is present when the X axis sensed area is in the effective contact region;
   determining whether the Y axis sensed area is in the effective contact region when the Y axis sensed area is present;
   determining a contact position when the X axis sensed area is in the effective contact region; and
   reading sense data signals of a second sensing unit row after the determining of the contact position for the first sensing unit row is finished.

2. The driving method of claim 1, wherein converting the sense data signals into preliminary signals comprises:
   converting the sense data signals included in the contactable range into preliminary signals having a first value; and
   converting the sense data signals outside of the contactable range into preliminary signals having a second value.

3. The driving method of claim 2, wherein determining whether the X axis sensed area is present comprises:
   determining that the X axis sensed area starts when the value of the preliminary signal is changed from the first value or the second value to the second value or the first value, respectively; and determining that the X axis sensed area finishes when the value of the preliminary signal is changed from the second value or the first value to the first value or the second value, respectively.

4. The driving method of claim 2, wherein the preliminary signals output from sensing units included in the X axis sensed area have the same values.

5. The driving method of claim 3, wherein determining whether the X axis sensed area is in an effective contact region comprises:
    determining whether the X axis sensed area is present;
    calculating a row length and determining whether the row length is included in a first effective range, when the X axis sensed area is present;
    calculating a first center position value when the row length is included in the first effective range;
    determining whether a center start position value is present;
    storing the calculated first center position value as the center start position value when the center start position value is not present and storing a number of the first sensing unit row as a Y axis start position value;
    calculating a distance between the center start position value and the first center start position value when the center start position value is present;
    determining whether the distance is included in a second effective range; and
    storing the number of the first sensing unit row as a Y axis end position value when the distance is included in the second effective range and storing the first center position value as the center start position value.

6. The driving method of claim 5, wherein determining whether the X axis sensed area is in an effective contact region further comprises:
    determining whether the Y axis sensed area is present when the X axis sensed area is not present, when the row length is not included in the first effective range, or whether the distance is not included in the second effective range.

7. The driving method of claim 6, wherein determining whether the X axis sensed area is in an effective contact region further comprises:
    outputting a signal indicating a state in which the row length is not included in the first effective range or a state in which the distance is not included in the second effective range.

8. The driving method of claim 5, wherein determining whether the Y axis sensed area is in an effective contact region comprises:
    determining whether the Y axis end value is present;
    calculating a column length based on the Y axis start position value and the Y axis end position value when the Y axis end position value is present;
    determining whether the calculated column length is included within a third effective range;
    determining the contact position when the calculated column length is included in the third effective range; and
    initializing variables when the calculated column length is not included in the third effective range.

9. The driving method of claim 8, wherein determining the contact position comprises:
    defining the center start position value as an X axis coordinate of the contact position;
    calculating a Y axis coordinate of the contact position based on the Y axis start position value and the Y axis end position value; and
    initializing variables.

10. The driving method of claim 9, wherein determining the contact position further comprises defining a center position value of the Y axis start position value and the Y axis end position value as the Y axis coordinate of the contact position.

11. The driving method of claim 6, wherein the first effective range is the same as the second effective range.

12. A display device, comprising:
    a display panel having a plurality of sensing units and a plurality of sense data lines connected to the sensing units;
    a sense signal processor connected to the display panel, the sense signal processor receiving analog sense data signals from the sense data lines, and converting the analog sense data signals to digital sense data signals; and
    a contact position determiner connected to the sense signal processor for determining a contact position based on the digital sense data signals,
    wherein the contact position determiner comprises:
        a processor reading the sense data signals of a first sensing unit row, the sense data signals being sequentially input, and determining for each sense data signal whether the sense data signal is included in a contactable range to convert the sense data signal into a preliminary signal; and
        an operator determining whether the first sensing row includes an X axis sensed area, determining whether the X axis sensed area is in an effective contact region when the X axis sensed area is present, determining whether a Y axis sensed area is present when the X axis sensed area is in an effective contact region, determining whether the Y axis sensed area is in an effective contact region when the Y axis sensed area is present, determining a contact position when the Y axis sensed area is in an effective contact region, and reading sense data signals of a second sensing unit row when the X axis sensed area or the Y axis sensed area is not in an effective contact region.

13. The display device of claim 12, wherein each of the digital sense data signals has a predetermined number of bits, and the processor converts the digital sense data signals having values that are included in the contactable range to preliminary signals having a first value, and converts the digital sense data signals having values that are not included in the contactable range to preliminary signals having a second value.

14. The display device of claim 13, wherein each of the preliminary signals is a one-bit signal.

15. The display device of claim 13, wherein the X axis sensed area starts when the value of the preliminary signal is changed from the second value to the first value, and finishes when the value of the preliminary signal is changed from the first value to the second value.

16. The display device of claim 13, wherein the operator:
    calculates a row length and determines whether the row length is included in a first effective range, when the X axis sensed area is present;
    calculates a first center position value when the row length is included within the first effective range;
    determines whether a center start position value is present, stores the calculated first center position value as the center start position value when the center start position value is not present, and stores a number of the current sensing unit row as a Y axis start position value;
    calculates a distance between the center start position value and the calculated first center start position value when the center start position value is present;

determines whether the distance is included within a second effective range; and stores the number of the current sensing unit row as a Y axis end position value when the distance is included within the second effective range and stores the calculated first center position value as the center start position value.

17. The display device of claim 16, wherein the operator determines whether the Y axis sensed area is present when the X axis sensed area is not present, when the row length is not included in the first effective range, or whether the distance is not included in the second effective range.

18. The display device of claim 17, wherein the operator determines whether the Y axis end value is present, calculates a column length based on the Y axis start position value and the Y axis end position value when the Y axis end position value is present, determines whether the calculated column length is included in a third effective range, and determines the contact position when the calculated column length is included in the third effective range.

19. The display device of claim 18, wherein the operator initializes variables when the calculated column length is not included in the third effective range.

* * * * *